United States Patent
Wu

(10) Patent No.: US 10,477,590 B2
(45) Date of Patent: Nov. 12, 2019

(54) APPARATUS AND METHOD FOR RANDOM ACCESS IN A WIRELESS COMMUNICATION SYSTEMS

(71) Applicant: Samsung Electronics Co., Ltd., Gyeonggi-do (KR)

(72) Inventor: Shangbin Wu, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/705,144

(22) Filed: Sep. 14, 2017

(65) Prior Publication Data

US 2018/0077733 A1 Mar. 15, 2018

(30) Foreign Application Priority Data

Sep. 14, 2016 (GB) .................................. 1615635.8
Sep. 13, 2017 (KR) ........................ 10-2017-0117336

(51) Int. Cl.
*H04W 74/08* (2009.01)
*H04L 5/00* (2006.01)
(Continued)

(52) U.S. Cl.
CPC ........... *H04W 74/0833* (2013.01); *H04L 1/00* (2013.01); *H04L 1/18* (2013.01); *H04L 5/0048* (2013.01);
(Continued)

(58) Field of Classification Search
CPC . H04W 74/0833; H04W 72/14; H04W 88/02; H04W 88/08; H04W 74/04;
(Continued)

(56) References Cited

U.S. PATENT DOCUMENTS

| 8,400,986 B2 | 3/2013 | Ozluturk | |
|---|---|---|---|
| 2010/0002590 A1* | 1/2010 | Park | H04W 74/006 370/241 |

(Continued)

FOREIGN PATENT DOCUMENTS

| WO | WO 2016/086144 A1 * | 6/2016 | ............ H04W 74/00 |
|---|---|---|---|
| WO | 2016127392 A1 | 8/2016 | |
| WO | 2016186385 A1 | 11/2016 | |

OTHER PUBLICATIONS

Ericsson; "Narrowband LTE—Random Access Design"; 3GPP TSG-RAN1 #82bis; R1-156011; Malmo, Sweden; Oct. 5-9, 2015; 11 pages.

(Continued)

*Primary Examiner* — Mong-Thuy T Tran

(57) ABSTRACT

A 5th Generation (5G) or pre-5G communication system for supporting a higher data rate than a 4G communication system such as Long Term Evolution (LTE) is provided. A method of a terminal for operating a random access in a wireless communication system may include transmitting, to a base station, a first message comprising a random access preamble, and receiving a plurality of second messages transmitted from the base station in response to the first message. A method of a base station for operating a random access in a wireless communication system may include receiving, from a terminal, a first message comprising a random access preamble, and transmitting, to the terminal, a plurality of second messages in response to the first message.

17 Claims, 8 Drawing Sheets

(51) Int. Cl.
  *H04W 72/14* (2009.01)
  *H04L 1/00* (2006.01)
  *H04L 1/18* (2006.01)
  *H04W 74/04* (2009.01)
  *H04W 88/08* (2009.01)
  *H04W 88/02* (2009.01)

(52) U.S. Cl.
  CPC ........... *H04L 5/0053* (2013.01); *H04W 72/14* (2013.01); *H04W 74/04* (2013.01); *H04L 5/0091* (2013.01); *H04W 88/02* (2013.01); *H04W 88/08* (2013.01)

(58) Field of Classification Search
  CPC . H04L 5/0048; H04L 1/00; H04L 1/18; H04L 5/0053; H04L 5/0091
  USPC .......................................................... 370/329
  See application file for complete search history.

(56) References Cited

U.S. PATENT DOCUMENTS

| | | | |
|---|---|---|---|
| 2010/0113051 A1 | 5/2010 | Du et al. | |
| 2011/0014922 A1* | 1/2011 | Jen | H04W 74/002 455/450 |
| 2013/0077485 A1* | 3/2013 | Bai | H04W 74/006 370/230 |
| 2015/0045043 A1* | 2/2015 | Chou | H04W 16/18 455/446 |
| 2015/0289292 A1 | 10/2015 | Sun et al. | |
| 2016/0057800 A1* | 2/2016 | Ingale | H04W 56/0005 370/216 |
| 2016/0143059 A1* | 5/2016 | Jha | H04W 76/10 370/329 |
| 2016/0323915 A1* | 11/2016 | Liu | H04W 16/14 |
| 2017/0273113 A1* | 9/2017 | Tirronen | H04W 4/70 |
| 2017/0332410 A1* | 11/2017 | Babaei | H04W 74/0833 |
| 2019/0182872 A1* | 6/2019 | Chen | H04W 72/0446 |

OTHER PUBLICATIONS

Wi rapporteur (Ericsson); "RAN1 Agreements for Rel-13 Nb-loT"; 3GPP TSG-RAN WG1 Meeting #84; R1-161548; St. Julian's, Malta; Feb. 15-19, 2016; 11 pages.

Qualcomm Incorporated; "New Work Item: NarrowBand IOT (Nb-IOT)"; 3GPP TSG RAN Meeting #69; RP-151621; Phoenix, USA; Sep. 14-16, 2015; 9 pages.

Kim et al.; "Enhancement of LTE RACH Through Extended Random Access Process"; Electronics Letters; vol. 50 No. 19; Sep. 11, 2014; 2 pages.

Foreign Communication from Related Counterpart Application; British Patent Application No. GB1615635.8; Combined Search and Examination Report dated Feb. 22, 2017; 6 pages.

UK Intellectual Property Office, "Examination Report under Section 18(3)," Application No. GB1615635.8, dated Jul. 24, 2019, 3 pages.

* cited by examiner

APPARATUS AND METHOD FOR RANDOM ACCESS IN A WIRELESS COMMUNICATION SYSTEMS

CROSS-REFERENCE TO RELATED APPLICATION AND CLAIM OF PRIORITY

This application is related to and claims priority to British Patent Application No. 1615635.8 filed on Sep. 14, 2016, and Korean Patent Application No. 10-2017-0117336 filed on Sep. 13, 2017, the contents of which are incorporated herein by reference.

TECHNICAL FIELD

The present disclosure relates generally to wireless communication. More, particularly, the present disclosure relates to an apparatus and a method for random access.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" or a "post long term evolution (LTE) system."

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to provide wireless communication service to a user, a remote node generally performs random access to access a higher node (e.g., a host node). When the remote node attempts such random access, a signal for random access may not be transmitted to the host node due to a channel state or interference with another signal, or the host node may reject the attempt at random access. When the random access fails for this reason, the remote node repeatedly attempts the random access until the random access is successful. Such repetitive random access may cause excessive power consumption by the remote node that performs the random access and may cause interference with another remote node.

As terminals having various functions propagate increasingly, an amount of uplink data transmitted in a wireless environment increases. Also, the number of users demanding more rapid uplink data transmission grows fast.

In the LTE Advanced Pro and the emerging 5G cellular networks, Machine-to-Machine (M2M) communications and Internet of Things (IoT) will play important roles. M2M and IoT enable connections between new types of terminals such as body sensors, vehicles, smart meters and the like, alongside the more familiar mobile phones. The upcoming LTE standards and 5G systems commit not only to support a massive number of M2M/IoT nodes but also to provide low latency access for M2M/IoT. This poses certain problems when it comes to supporting such a large number of new network entities.

It is estimated that by the year 2020, the number of connected IoT entities will reach 50 billion, and these devices are expected to experience a low end to end (E2E) latency—approximately 10% of that experienced in 4G systems.

Such a large number of nodes introduce pressure on the scarce resources available for random access. When such a massive number of devices try to initiate random accesses to the network, they may collide with each other, resulting in large latencies, which are not generally acceptable.

The massive number of IoTs and M2M entities and transactions in a network introduces pressure on the scarce resource for random access. The current LTE standard procedure of random access consists of four steps. In step one, a User Equipment (UE) transmits a randomly selected preamble sequence on Physical Random Access Channel (PRACH) to a base station (BS). In step two, the BS transmits a Random Access Response (RAR) on the Physical Downlink Shared Channel (PDSCH) in response to the detected preamble sequence. In step three, the UE transmits its identity and other messages (e.g., scheduling request) to the BS using the Physical Uplink Shared Channel (PUSCH) resources assigned in the RAR in the second step. In the last step, the BS echoes the identity of the UE received in the third step on PDSCH.

However, when a massive number of nodes try to initiate random accesses, they may collide with each other, resulting in PRACH overload and large—and often unacceptable—connection latencies. Currently different strategies have been proposed to deal with massive random accesses in the medium access control (MAC) layer. However, these methods are typically not sufficient to meet the latency requirements as MAC layer signaling is not as responsive as physical layer signaling.

There is therefore a desire to provide an improved random access mechanism which avoids this and other problems experienced in the prior art.

SUMMARY

To address the above-discussed deficiencies, it is a primary object to provide an apparatus and a method for effectively performing a random access in a wireless communication system.

The present disclosure provides an apparatus and a method for transmitting a signal including a preamble and data in a wireless communication system.

The present disclosure provides an apparatus and a method for performing simultaneously a plurality of random accesses based on angle of arrival information in a wireless communication system.

In accordance with an aspect of the present disclosure, an apparatus of a terminal in a wireless communication system is provided. The apparatus includes a transceiver and at least one processor operatively connected to the transceiver. The at least one processor is configured to transmit, to a base station, a first message comprising a random access preamble, and to receive a plurality of second messages transmitted from the base station in response to the first message.

In accordance with an aspect of the present disclosure, an apparatus of a base station (BS) in a wireless communication system is provided. The apparatus includes a transceiver and at least one processor operatively connected to the transceiver. The at least one processor is configured to receive, from a terminal, a first message comprising a random access preamble, and to transmit, to the terminal, a plurality of second messages in response to the first message.

In accordance with an aspect of the present disclosure, a method of a terminal in a wireless communication system is provided. The method includes transmitting, to a base station, a first message comprising a random access preamble, and receiving a plurality of second messages transmitted from the base station in response to the first message.

In accordance with an aspect of the present disclosure, a method of a base station in a wireless communication system is provided. The method includes receiving, from a terminal, a first message comprising a random access preamble, and transmitting, to the terminal, a plurality of second messages in response to the first message.

Effects which can be acquired by the present disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In various embodiments of the present disclosure described below, a hardware approach will be described as an example. However, since the embodiments of the present disclosure include a technology using both hardware and software, the present disclosure does not exclude a software-based approach.

Figure 1:
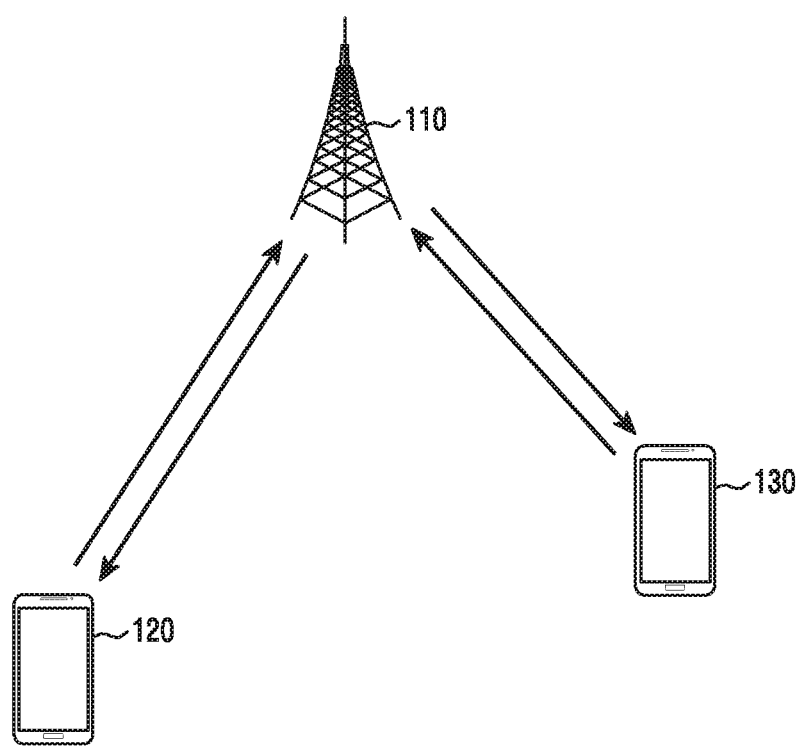
FIG. 1 illustrates a wireless communication system according to various embodiments of the present disclosure.

FIG. 1 illustrates a wireless communication system according to an embodiment of the present disclosure.

Referring to FIG. 1, a base station (BS) 110, a terminal 120, and a terminal 130 are illustrated as some of the nodes using a wireless channel in a wireless communication system. FIG. 1 illustrates only one BS, but another BS, which is the same as or similar to the BS 110, may be further included.

The BS 110 is network infrastructure element that provides wireless access to the terminals 120 and 130. The BS 110 has coverage defined for a predetermined geographical region based on the distance at which a signal can be transmitted. The BS 110 may be referred to as an "access point (AP)", an "eNodeB (eNB)", a "5th-generation (5G) node", a "5G NodeB (NB)", a "wireless point", a "transmission/reception point (TRP)", or other terms having equivalent technical meaning, as well as a "BS".

Each of the terminals 120 and 130 is a device used by a user, and performs communication with the BS 110 through a wireless channel. Depending on the case, at least one of the terminals 120 and 130 may operate without user involvement. At least one of the terminals 120 and 130 may be a device that performs machine-type communication (MTC), and may not be carried by the user. Each of the terminals 120 and 130 may be referred to as "user equipment (UE)", a "mobile station", a "subscriber station", a "remote terminal", a "wireless terminal", a "user device", or other terms having the equivalent technical meaning, as well as "terminal".

The BS 110, the terminal 120, and the terminal 130 may transmit and receive wireless signals in millimeter-wave (mmWave) bands (e.g., 28 GHz, 30 GHz, 38 GHz, and 60 GHz). In order to increase a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure.

In one embodiment, each of the terminals 120 and 130 may implement a random access procedure with the BS 110. In one example, the terminal 120 or the terminal 130 may search adjacent BS as the terminal 120 or the terminal 130 is powered on. The terminal 120 or the terminal 130 may initiate the procedure for the random access to establish a wireless link for data transmission with the BS. In another example, the terminal 120 and the terminal 130 may initiate the random access procedure by receiving a paging signal when the terminal 120 or the terminal 130 is in IDLE status.

Figure 2:
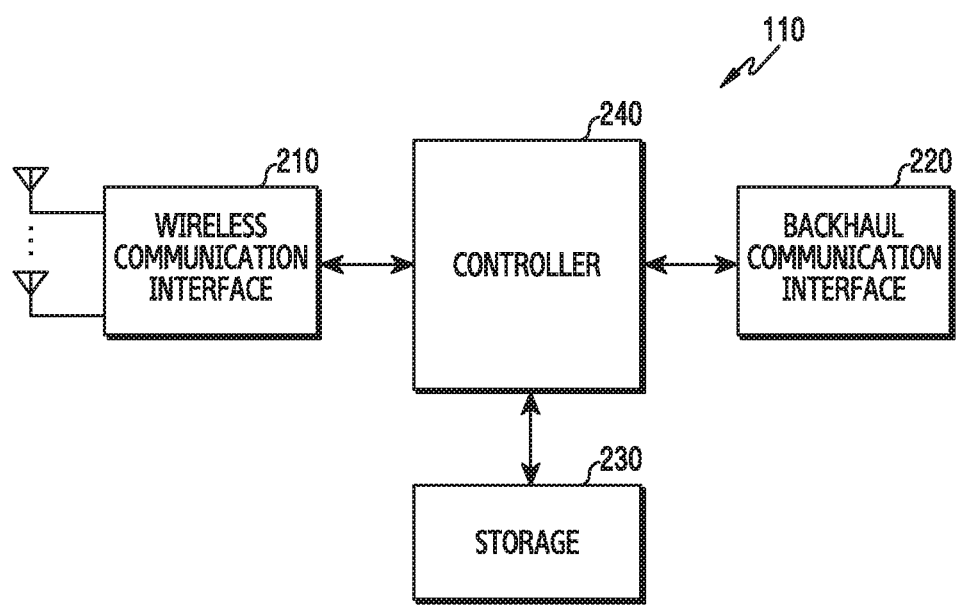
FIG. 2 illustrates a functional block diagram of a base station (BS) in a wireless communication system according to various embodiments of the present disclosure.

FIG. 2 illustrates an example configuration of a base station in a wireless communication system according to an exemplary embodiment of the present disclosure. FIG. 2 illustrates an example of a configuration of the base station 110. Hereinafter, the term "unit" or the term ending with the suffix "-er" or "-or" refer to a unit for processing at least one function or operation and these terms may be implemented by using hardware or software or a combination of hardware and software.

Referring to FIG. 2, the base station includes a wireless communication interface 210, a backhaul communication interface 220, a storage 230, and a controller 240.

The wireless communication interface 210 performs functions for transmitting and receiving signals via a radio channel. For example, the wireless communication interface 210 performs a function of converting between a baseband signal and a bit string according to a physical layer standard of a system. For example, when transmitting data, the wireless communication interface 210 generates complex symbols by encoding and modulating a transmission bit string. In addition, when receiving data, the wireless communication interface 210 restores a reception bit string by demodulating and decoding a baseband signal. In addition, the wireless communication interface 210 up-converts a baseband signal into a radio frequency (RF) band signal and then transmit the RF band signal through an antenna, and down-converts an RF band signal received through the antenna into a baseband signal.

For example, the wireless communication interface 210 may include a transmission filter, a reception filter, an amplifier, a mixer, an oscillator, a digital to analog converter (DAC), an analog-to-digital converter (ADC), or the like. In addition, the wireless communication interface 210 may include at least one antenna array configured by a plurality of antenna elements. In view of hardware, the wireless communication interface 210 may be configured by a digital unit and an analog unit, and the analog unit may be configured by a plurality of sub-units according to operation power and operation frequency.

The wireless communication interface 210 transmits and receives signals as described above. Accordingly, the wireless communication interface 210 may be referred to as a transmission interface, a reception interface, a transmission and reception interface, a transmitter, a receiver or a transceiver. In addition, in the following description, transmitting and receiving performed through a radio channel may include processing by the wireless communication interface 210 as described above. According to one embodiment, the wireless communication interface 210 may receive a plurality of preambles for the random access from a plurality of terminals located within the coverage of the BS. Also, the wireless communication interface 210 may transmit an acknowledgement (ACK) message to a terminal as information indicating whether the random access successes. If the random access is implemented successfully, the wireless communication interface 210 may allocate resource for the terminal and performing a transmission or a reception of data.

The backhaul communication interface 220 provides an interface for communication with other nodes in a network. That is, the backhaul communication interface 220 converts a bit string to be transmitted from the base station to another node, for example, another access node, another base station, a core network, or the like into a physical signal, and converts a physical signal received from another node into a bit string.

The storage 230 stores data such as a basic program, an application program, setting information, or the like for the operation of the base station 110. The storage 230 may be configured by a volatile memory, a nonvolatile memory, or a combination of a volatile memory and a nonvolatile memory. The storage 230 provides the stored data according to a request of the storage 230 and the controller 240.

The controller 240 controls overall operations of the base station 110. For example, the controller 240 transmits and receives signals through the wireless communication interface 210 or the backhaul communication interface 220. In addition, the controller 240 records and reads data on and from the storage 230. The controller 240 may perform functions of a protocol stack which a communication standard requires. To achieve this, the controller 240 may include at least one processor.

According to exemplary embodiments of the present disclosure, the controller 240 may receive data simultaneously transmitted with a preamble, and decode user data successfully. Also, the controller 240 may estimate a number of terminals based on angle of arrival (AoA), if the user data is not decoded successfully as a plurality of terminals transmit data through same preamble. Accordingly, the controller 240 may control the BS to transmit response signals, to the plurality of terminals, the response signals comprising RAR messages of the estimated number of terminals. The plurality of terminals receiving the response signals may comprise terminals performing the random access simultaneously by using the same preamble. For example, the controller 240 may control the base station 110 to perform operations according to the exemplary embodiments of the present disclosure.

Figure 3:
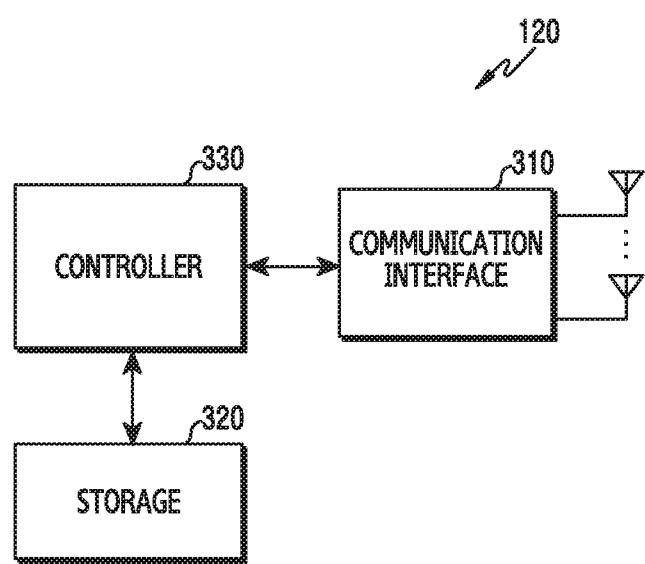
FIG. 3 illustrates a functional block diagram of a user equipment (UE) according to various embodiments of the present disclosure.

FIG. 3 illustrates an example configuration of a terminal in a wireless communication system according to an exemplary embodiment of the disclosure. FIG. 3 illustrates an example of a configuration of the terminal 120, 121, or 122. Hereinafter, the term "unit" or the term ending with the suffix "-er" or "-or" refer to a unit for processing at least one function or operation and these terms may be implemented by using hardware or software or a combination of hardware and software.

Referring to FIG. 3, the terminal includes a communication interface 310, a storage 320, and a controller 330.

The communication interface 310 performs functions for transmitting and receiving signals via a radio channel. For example, the communication interface 310 performs a function of converting between a baseband signal and a bit string according to a physical layer standard of a system. For example, when transmitting data, the communication interface 310 generates complex symbols by encoding and modulating a transmission bit string. In addition, when receiving data, the communication interface 310 restores a reception bit string by demodulating and decoding a baseband signal. In addition, the communication interface 310 up-converts a baseband signal into an RF band signal and then transmit the RF band signal through an antenna, and down-converts an RF band signal received through the antenna into a baseband signal. For example, the communication interface 310 may include a transmission filter, a reception filter, an amplifier, a mixer, an oscillator, a DAC, an ADC, or the like.

The communication interface 310 may include a plurality of transmission/reception paths. The communication interface 310 may include at least one antenna array configured by a plurality of antenna elements. In view of hardware, the communication interface 310 may be configured by a digital circuitry and an analog circuitry (e.g., radio frequency integrated circuit (RFIC)). Here, the digital circuitry and analog circuitry may be implemented as one package. Also, the communication interface 310 may include a plurality of RF chain. The communication interface 310 may perform beamforming.

Also, the communication interface 310 may include different communication modules for processing signals of different frequency band. The communication interface 310 may include a plurality of communication modules for supporting a plurality of different wireless access technologies. For example, the plurality of different wireless access technologies may include Bluetooth low energy (BLE), WI-FI®, Wi-Fi gigabyte (WiGig), cellular network (e.g., long term evolution (LTE)), or the like. Also, different frequency bands may include super high frequency (SHF) (e.g., 2.5 GHz, 5 GHz) band and millimeter wave (e.g., 60 GHz).

The communication interface 310 transmits and receives signals as described above. Accordingly, the communication interface 310 may be referred to as a transmission interface, a reception interface, a transmission and reception interface, a transmitter, a receiver or a transceiver. In addition, in the following description, transmitting and receiving performed through a radio channel may include processing by the communication interface 310 as described above.

In one embodiment, the communication interface 310 may transmit, to the BS, a preamble for the random access. More specifically, the terminal may identify a neighboring BS by performing cell search, and the communication interface 310 may transmit the preamble and user data simultaneously. Herein, the user data may include a plurality of data, the data being a portion of the user data. Also, the communication interface 310 may receive an ACK message from the BS, if the user data is decoded successfully. Accordingly, the communication interface 310 may receive resource allocation and perform a transmission or a reception of data.

The storage 320 stores data such as a basic program for the operation of the terminal, an application program, setting information, or the like. The storage 310 may be configured by a volatile memory, a nonvolatile memory, or a combination of a volatile memory and a nonvolatile memory. In addition, the storage 320 provides stored data in response to a request of the controller 330.

The controller 330 controls overall operations of the terminal. For example, the controller 330 transmits and receives signals through the communication interface 310. In addition, the controller 330 records and reads data on and from the storage 320. The controller 330 may perform functions of a protocol stack which the communication standard requires. To achieve this, the controller 330 may include at least one processor or microprocessor or may be a part of the processor. In addition, a part of the communication interface 310 and the controller 330 may be referred to as a communication processor (CP).

According to exemplary embodiments of the present disclosure, the controller 330 may generate a signal for the random access. The controller 330 may divide the user data into the plurality of data, and generate the signal for the random access comprising the preamble and one of the plurality of data. That is, the terminal may transmit the preamble and the data to the BS simultaneously. If the user data is decoded successfully, the controller 330 may receive, from the BS, an ACK message indicating that the user data is decoded successfully. In contrast, if the user data is not decoded successfully, the controller 330 may control the communication interface 310 to receive a number M of RAR messages from the BS. The controller 330 may randomly select one RAR message among the M number of RAR messages. The controller may generate and transmit Msg3, to the BS, based on the randomly selected RAR message. The controller 330 may receive, from the BS, Msg4 in response to Msg3. For example, the controller 330 may control the terminal to perform operations according to the exemplary embodiments of the present disclosure.

For the following description, a modified signal structure for a simultaneous random access for a plurality of UEs would be described.

Embodiments of the present disclosure allow a substantial increase in random access capacity. This may have the effect of reducing latency and so permitting simultaneous access by a plurality of different UEs.

This improvement is permitted, in part, by the use of MIMO (multiple input multiple output)-enabled BS. MIMO refers to multiple-input multiple-output and relates to the provision of a large number of antennas, particularly on the BS. The large number of antennas may provide a high degree of spatial resolution.

Furthermore, amendment of the prior art Message 1 (MSG1) enables one-stage transmission to occur. A further improvement lies in the provision of a collision-avoiding algorithm. A still further improvement lies in the ability of a BS to transmit multiple RARs simultaneously.

Figure 4:
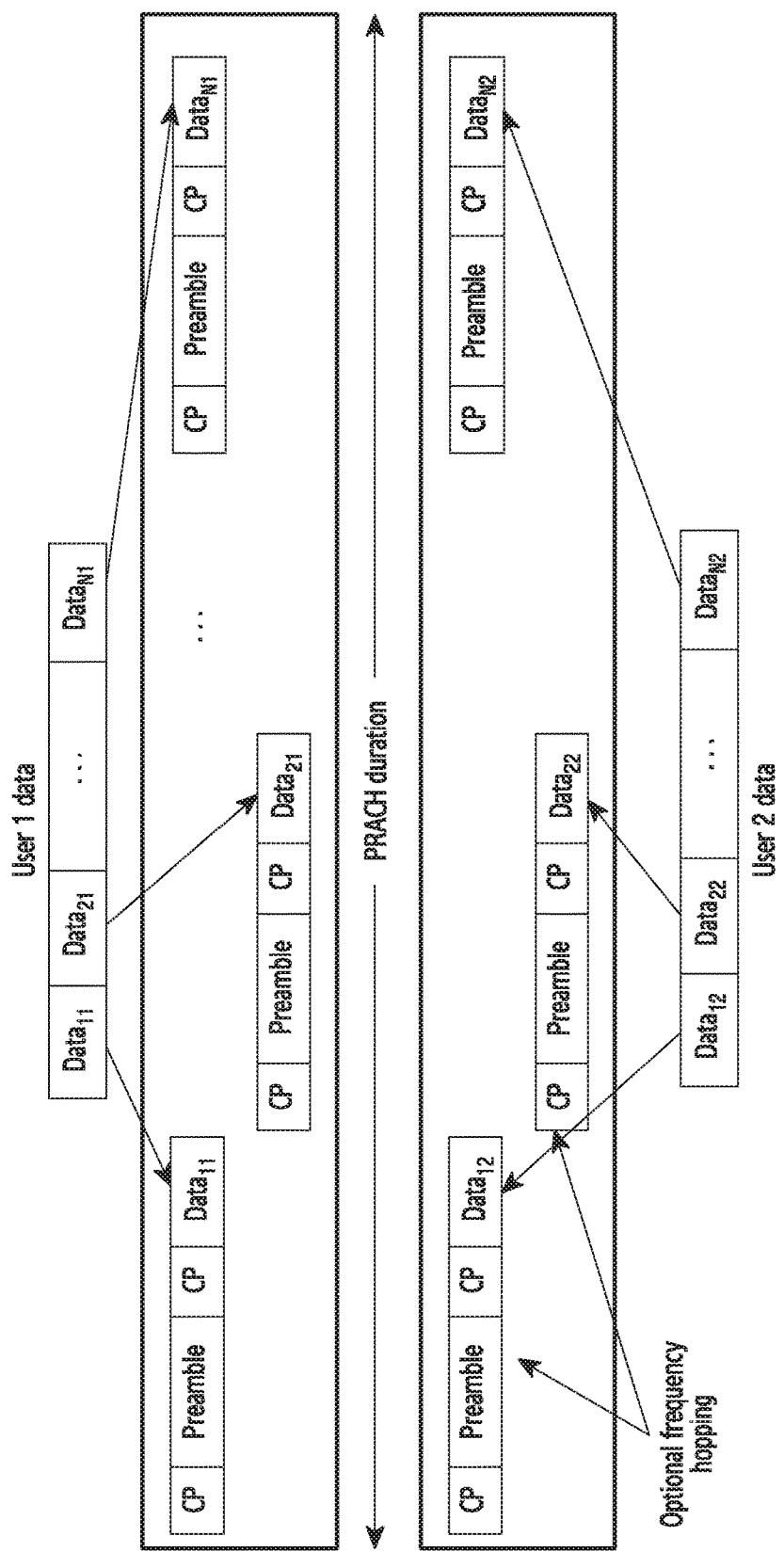
FIG. 4 illustrates an altered structure of a random access signal in a wireless communication system according to various embodiments of the present disclosure.

FIG. 4 illustrates a structure of a random access signal in a wireless communication system according to various embodiments of the present disclosure;

Referring to the FIG. 4, a UE of user 1 may refer to UE 120, a UE of user 2 may refer to UE 130.

FIG. 4 illustrates that the structure of the signal transmitted from the UE, requesting the random access, is altered. The user data is divided into N parts and the signal generated includes the preamble and the user data together. The preamble and user data parts are transmitted in turn on the PRACH (physical random access channel). It should be noted that data signals transmitted from different users are assumed independent, which forms the basis for Angle of Arrival (AoA) estimation. If there is no preamble collision, the user data will be transmitted successfully via the random access signal of altered structure. As a result, latency of UE access is then reduced. On the contrary, if preamble collision occurs, the BS can estimate how many users are colliding in the spatial domain using the user data. The preamble referred to is the standard preamble defined in the codebook for the respective communication standard.

FIG. 4 illustrates that the User 1 data comprises several different parts—$Data_{11}$-$Data_{N1}$—and that these separate parts are transmitted along with the preamble, as shown. A similar arrangement applies to user 2 and a plurality of other users. This figure illustrates how collisions are likely, given the potentially large number of transmissions which may be initiated at any given time if a same preamble is used to transmit data by different users. According to one embodiment, the UE may selectively perform a frequency hopping. For example, the UE may transmit a plurality of random access signals comprising the preamble and the data during a period of PRACH duration. Thus, to reduce an interference between another random access signals from a plurality of other UEs, the terminal may transmit the plurality of random access signals by the frequency hopping between a first frequency and a second frequency.

An additional requirement in IoT (internet of things) is that the battery life of entities in M2M (machine to machine) communication and IoTs are expected to be in the region of ten years. This requires highly power efficient transmission schemes. In practice, the user data, shown in FIG. 2, can be modulated with constant envelope modulation schemes such as Quadrature Phase Shift Keying (QPSK), which means that power efficient amplifiers can be utilized in the M2M/IoT nodes, as the Peak to Average Power Ratio (PAPR) is low.

The general enhanced IoT random access procedure according to embodiments of the present disclosure may have two possible outcomes. One is that the UE data sent along with the preamble is successfully decoded by the BS. This is most likely to happen when preamble collision does not occur. In this case, a one stage transmission process is provided.

Figure 5:
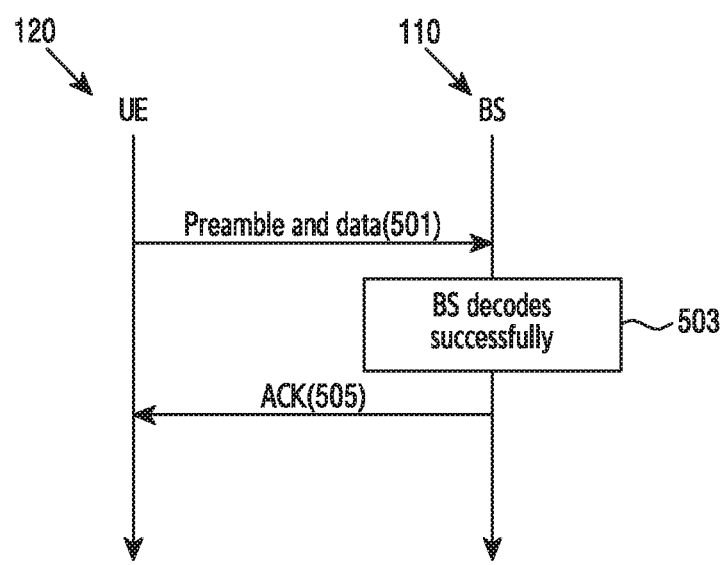
FIG. 5 illustrates a signal exchange flowchart for a random access according to various embodiments of the present disclosure.

FIG. 5 illustrates a signal exchange flowchart for a random access according to various embodiments of the present disclosure.

Referring to FIG. 5, at step 501, the UE transmits the preamble and data to the BS. The preamble and the data can be transmitted to the BS simultaneously, and the preamble and the data can be transmitted included in the signal of altered structure as set out in FIG. 4.

At step 503, the BS may decode the data successfully. The BS may receive a plurality of signals from the UE, and each of the plurality of signals may include the preamble and a portion of user data. Therefore, the BS may acquire a plurality of portions of the user data by receiving the plurality of signals and removing the preamble and cyclic prefix (CP) from each of the plurality of signals. The BS may acquire the whole user data by concatenating the acquired plurality of portions of the user data, and decode the whole user data. For example, if the UE encodes the user data by using tail biting convolution code (TBCC), the BS may decode the user data by using Viterbi decoding.

At step 505, the BS may transmit an acknowledgement (ACK) to the UE. If the BS decodes the user data successfully, the BS may determine that there is no preamble collision between other user using the same preamble, and that the random access is successful. Thus, the BS may transmit the ACK message to the UE. The benefit of this is that the latency of transmission is largely reduced, since the user data is transmitted along with the preamble.

Even though the embodiment only describes transmitting the preamble and the data simultaneously, the present disclosure is not limited to the embodiment. In another embodiment, the terminal may transmit data after the random access. For example, the terminal may transmit, to the BS, only preamble, and transmit the user data through PUSCH allocated after the random access.

Figure 6:
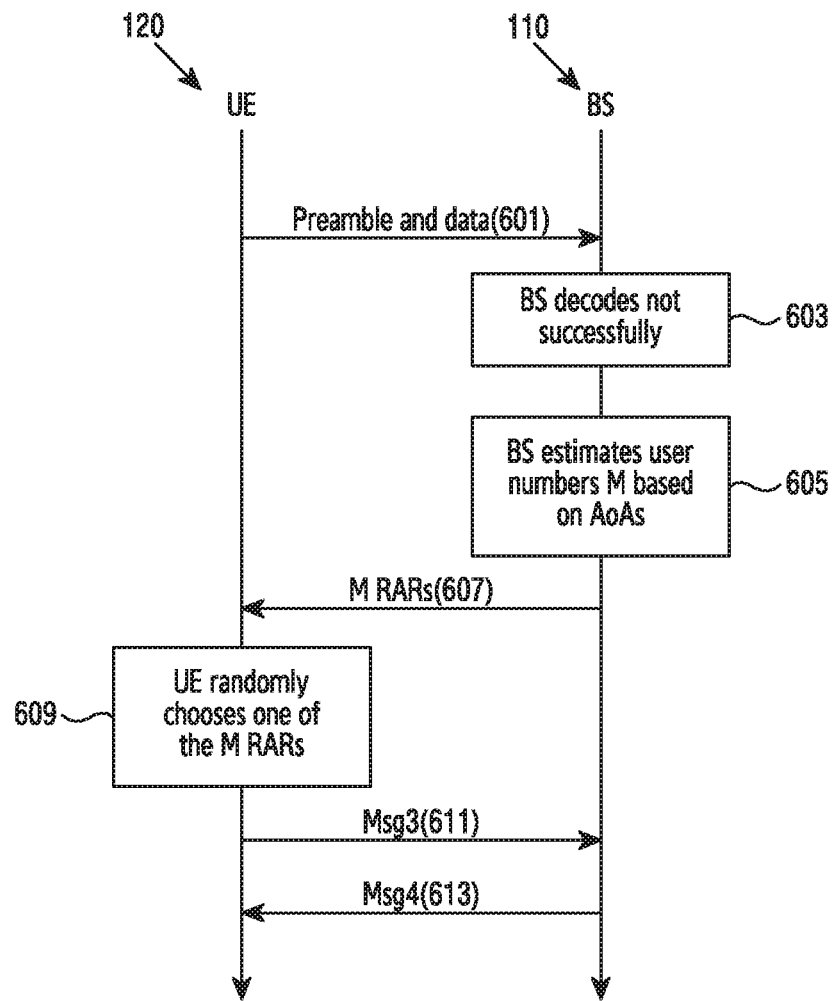
FIG. 6 illustrates another signal exchange flowchart for a random access in a wireless communication system according to various embodiments of the present disclosure.

FIG. 6 illustrates another signal exchange flowchart for a random access in a wireless communication system according to various embodiments of the present disclosure.

Alternatively, when/if there are multiple UEs using the same preamble, the one-stage method set out above will automatically fallback to a two stage method, i.e., the UE requests resources in a first stage and transmits data in a second stage as shown in FIG. 6.

Referring to FIG. 6, at step 601, the UE may transmit preamble and data to the BS. The step 601 of FIG. 6 may correspond to the step 501 of FIG. 5.

At step 603, the BS may fail to decode the user data successfully. For example, if the first UE and the second UE use the same preamble, the BS receives data for both the first UE and the second UE through the same preamble. In this case, each signal from both the first UE and the second UE may be an interference to each other, and this can referred as preamble collision. Therefore, the BS may fail to decode the user data because of the preamble collision.

At step 605, the BS may estimate a number of user based on AoA information. The BS may estimate the number M of users based on the AoA information, which may be derived from the MIMO system. The ability to resolve M different users will depend on the number of antennas deployed in the system. As an example, with 16 antennas, it may be possible to resolve 5 to 7 distinct users, based on their AoA information. The embodiment illustrates only resolving of user based on the AoA information, but the present invention is not limited to the embodiment. In other embodiment, the BS may resolve users based on a reference signal received power (RSRP), a path loss of the received signal etc. Also, in another embodiment, the BS may resolve the users based on the AoA information and at least one of RSRP and the path loss.

Details of how the number M of users may be estimated, follows. It should be noted that this technique is known in the art. Other techniques may be used, as required.

Assume that the concatenated received data symbols at the BS are x(t) and the steering vectors of the BS from K (K≤Q≤N) different AoAs $\theta_1$, $\theta_2$ . . . , $\theta_K$ are $\alpha(\theta_1)$ $\alpha(\theta_2)$, . . . , $\alpha(\theta_K)$, where Q is the maximum number of resolvable UEs. It should be noted that the concatenated received data symbol may contain data symbols from multiple UEs. In addition, data symbols from different UEs are assumed independent. The received signal at the BS is:

$$x(t)=As(t)+n(t)$$

where $A=[\alpha(\theta_1)\,\alpha(\theta_2)\ldots\alpha(\theta_K)]$ is the steering matrix at the BS, s(t) is aggregate data symbols of from UEs, and n(t) is the Gaussian noise vector. The BS will perform the MUltiple SIgnal Classifier (MUSIC) algorithm to obtain the power angular spectrum (PAS) $P(\theta)$. The MUSIC algorithm is an algorithm which estimates the angle of arrival by using orthogonal characteristic between a directional vector of a received signal and an Eigen vector of the signal subspace.

Step 1: Compute the N-by-N correlation matrix R by:

$$R=E\{x(t)x^H(t)\}$$

Step 2: Eigen value decomposition on R:

$$R=U\Sigma U^H$$

where U is the N-by-N Eigen vector matrix and $\Sigma$ is the diagonal Eigen value matrix.

Step 3: Partition the Eigen vector matrix by:

$$U=[U_Q\ \tilde{U}_Q]$$

where $\tilde{U}_Q$ is the N-by-(N−Q) Eigen vector matrix whose columns correspond to the noise subspace.

Step 4: Search through all angles θ, the PAS can be obtained by:

$$P(\theta) = \frac{1}{a^H(\theta)\hat{U}_Q}$$

Step 5: Find the estimated AoA set $B=\{\tilde{\theta}_1, \tilde{\theta}_2 \ldots \tilde{\theta}Q\}$ in the PAS, where $\tilde{\theta}_1, \tilde{\theta}_2, \ldots, \tilde{\theta}_Q$ are the roots of:

$$\frac{dP(\theta)}{d\theta} = 0$$

Step 6: 6: Remove $\tilde{\theta}_l$ in $B'=\{\tilde{\theta}_1, \tilde{\theta}_2 \ldots \tilde{\theta}_Q\}$ if $P(\tilde{\theta}_l)$ is less than a certain threshold ε. Then the estimated number of users M=|B|.

At step 607, the BS may transmit a total of M RAR messages. The BS may estimate the number of users as M based on the AoA information, the users transmitting data through the same preamble. The RAR message may include at least one of information for a preamble sequence, timing advance (TA), identifier (e.g., cell-radio network temporary identifier (C-RNTI)), and an uplink grant information. According to various embodiments of the present invention, the BS may transmit the number M of RAR messages, each of the number M of RAR messages is different each other. For example, each of the number M of RAR messages may have different RNTI values. The BS may transmit the number M of RAR message for the number M of terminals transmitting data through the same preamble. Therefore, the terminal may receive the number M of RAR messages and acquire different RNTI by randomly selecting one RAR message among the number M of RAR messages. In another example, the BS may transmit the number M of RAR message, each of the number M of RAR messages including the number M of different uplink grant information. Thus, the terminal may receive the number M of RAR messages and transmit Msg3 according to different uplink grant information by randomly selecting one RAR message among the number M of RARs messages. By transmitting Msg3 according to different uplink grant information, an additional collision may be reduced. In another example, each of the number M of RAR messages may comprise a TA value, and each of the TA values for the number M of RAR messages may be different from each other or the same. According to another embodiment of the present invention, the BS may transmit a number M of same RAR messages.

At step 609, UE may randomly select one such RAR message among the received M number of RAR messages. Each of UEs receiving the M number of RAR messages may select any one RAR message among the received M number of RAR messages. Because each of the UEs selects one RAR message randomly, each of different UEs may select the same RAR message. However, the collision probability itself can be reduced by an additional randomness provided from the M number of RAR message.

At step 611, the UE may transmit Msg3 to the BS. The UE may transmit the Msg3 based on the one RAR message randomly selected among the M number of RAR messages.

At step 613, the BS may transmit Msg4 in response to receiving the Msg3 from the UE. The Msg4 may include information indicating whether the random access is successful. Herein the Msg 3 and the Msg4 correspond to messages having the same names in the related art.

In the related art of LTE systems, the BS will only transmit one RAR back to UEs even if there are multiple UEs using the same preamble. According to various embodiments of the present disclosure, the BS will try to estimate the number M of UEs using the same preamble by distinguishing AoAs from different UEs. Then the BS will send the corresponding number M of RARs to the UEs. Consequently, there will be more resources assigned to multiple UEs to avoid RACH overload. Each UE randomly selects one RAR and the remaining steps are the same as current 3GPP (3rd generation project partnership). Although there is still a chance that multiple UEs select the same RAR, the collision probability is further reduced by the extra randomness introduced.

Figure 7:
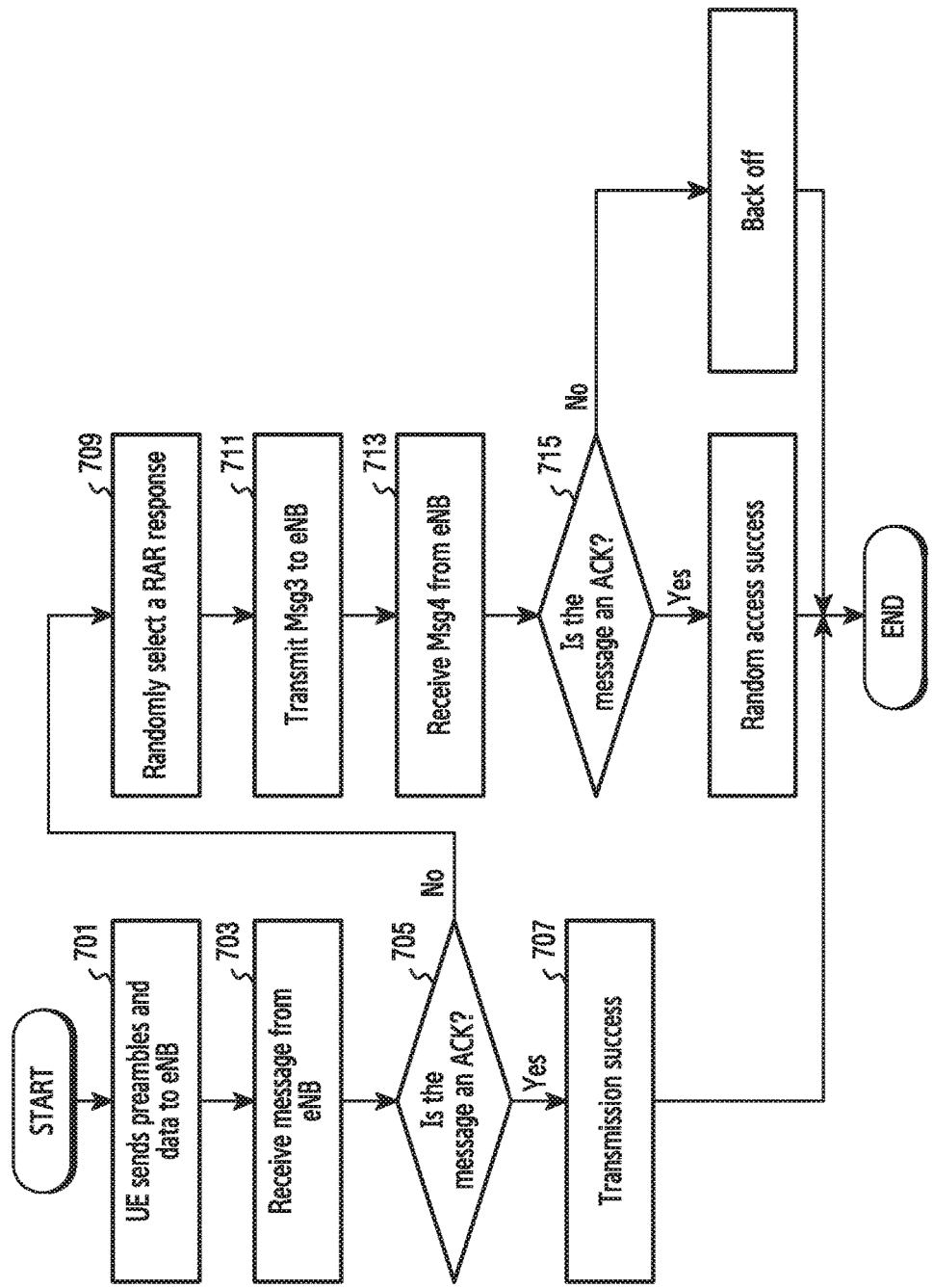
FIG. 7 illustrates operations of a UE in a wireless communication system according to various embodiments of the present disclosure.

FIG. 7 illustrates operation of the UE in the wireless communication system according to various embodiments of the present disclosure. FIG. 7 illustrates operation of the UE 120 or the UE 130.

Referring to FIG. 7, the UE may transmit the preamble and data to the BS. The UE may randomly select the preamble, generate the random access signal including the preamble and the data as illustrated in FIG. 4, and transmit the preamble and the data to the BS.

At step 703, the UE may receive a message from the BS. The message may vary based on whether the BS successfully decodes the data transmitted from the UE. In short, whether the data is decoded successfully may indicate the random access was success without a preamble collision between other users.

At step 705, the UE may determine whether the received message is an ACK message. If the BS responds with the ACK message, this may mean that the random access of the UE and the data transmission has been successful.

At step 707, the UE may determine that the transmission has been successful. That is, by receiving the ACK message, the UE may determine that the data has been successfully decoded by the BS. Also, the UE may determine that the random access has been successful without the preamble collision by receiving the ACK message.

At step 709, the UE may randomly select one RAR message. If the data is not decoded successfully, the UE may receive a plurality of RARs from the BS. A number of the plurality of RARs is equal to a number of users which experience the preamble collision by transmitting the user data through the same preamble. Therefore, to avoid additional collision with other users, the UE may randomly select the one RAR message among the plurality of RAR messages.

At step 711, the UE may transmit Msg3 to the BS. The UE may transmit the Msg3 based on the randomly selected one RAR message. By doing this, each of the plurality of users using the same preamble may avoid the collision by transmitting the Msg3 based on the different RAR.

At step 713, the UE may receive Msg4 from the BS. The Msg4 may indicate whether the random access has been success.

At step 715, the UE may determine that the ACK message is received. The UE may determine whether the received message is the ACK message. If Msg4 is ACK message, the UE may determine that a connection between the UE and the BS is established successfully. In contrast, if the Msg4 is not ACK message, the UE may determine that the random access fails. Therefore, the UE needs to back off before another random access attempt.

Figure 8:
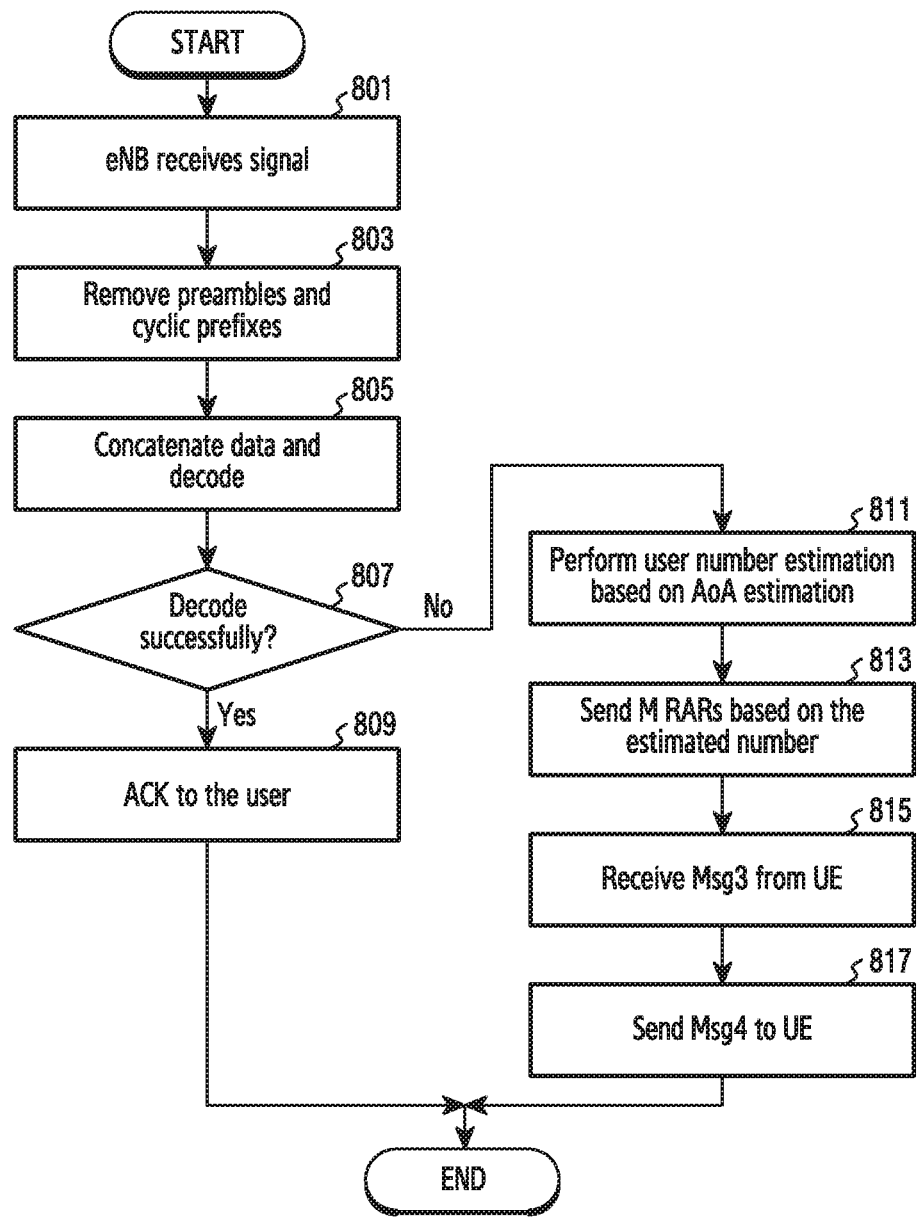
FIG. 8 illustrates operations of a BS in the wireless communication system according to various embodiments of the present disclosure.

FIG. 8 illustrates operations of a BS in the wireless communication system according to various embodiments of the present disclosure. FIG. 8 examples an operational method of the BS 110.

Referring to FIG. 8, at step 801, the BS may receive a signal from the UE. The BS may receive, from the UE, the signal including a preamble and data. The signal including the preamble and the data may correspond to the random access signal having altered structure as illustrated in FIG. 4.

At step 803, the BS may remove preambles and CPs. The random access signal may include a guard period of the CP because of a timing uncertainty. The BS may acquire the user data by removing the preamble and the CP from the signal.

At step 805, the BS may concatenate the data and attempt to decode. Because the UE repeatedly transmits the signal including the preamble and the data during PRACH duration, the BS may receive a plurality of data. Each of the repeatedly transmitted signal may include different data. The BS may acquire single user data by concatenating the received different data.

At step 807, the BS may determine that the data is decoded successfully. If there is no preamble collision, the BS may decode the concatenated data for each of the plurality of UEs. If there is preamble collision, an interference between UEs using the same preamble would occur and the BS may fail to decode the concatenated data.

At step 809, the BS may transmit the ACK message to the UE. If the data is successfully decoded without the preamble collision, the BS may feedback the ACK message to the UE. In contrast, if the data is not successfully decoded, there are two possible situations. One is that there is only one UE using the preamble, but the channel condition is so bad that the BS cannot decode the data signal correctly. The other is that there are multiple UEs using the same preamble and the interference among them is too large for the BS to correctly decode the data signal. Neither situation will impact the user number estimation based on AoA estimation.

At step 811, the BS may estimate a number of users based on AoA information.

At step 813, the BS may transmit a number M of RAR messages to the number M of UEs, where M is the estimated number of users transmitting the random access signal through the same preamble.

At step 815, the BS may receive Msg3 from UEs. The Msg3 may be generated based on the selected one RAR message among the number M of the RAR messages. Thus, there is still a probability to select the same RAR message.

At step 817, the BS may transmit Msg4 to the UE. If the BS receives same RAR messages from different UEs, the BS may determine that the random access fails. In contrast, if the BS receives different RAR messages from different UEs, the BS may determine that the random access is successful. Therefore, the BS may transmit, to the UE, Msg4 indicating that the random access success. In this case, the Msg4 may be the ACK message.

Advantageously, various embodiments of the present disclosure offer improved performance when multiple UEs perform random access requests simultaneously. This problem is only expected to worsen with the increased prevalence of M2M and IoT nodes. A further benefit is associated with reduce latency, particularly by the use of a one-stage random access procedure in optimal cases. If the one-stage process is not viable, then an automatic fall back is provided to prior art techniques.

Methods according to embodiments stated in claims and/or specifications of the present disclosure may be implemented in hardware, software, or a combination of hardware and software.

The software may be stored in a computer-readable storage medium. The computer-readable storage medium stores at least one program (software module) including instructions that causes, when executed by at least one processor in the electronic device, the electronic device to perform the method of the present disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs) or other type optical storage devices, or a magnetic cassette. Alternatively, any combination of some or all thereof may form a memory in which the program is stored. Further, a plurality of such memories may be included in the electronic device.

In addition, the programs may be stored in an attachable storage device which may access the electronic device through communication networks such as the internet, intranet, local area network (LAN), wide LAN (WLAN), and storage area network (SAN) or a combination thereof. Such a storage device may access a device performing an embodiment of the present disclosure, via an external port. Further, a separate storage device on the communication network may access the device performing an embodiment of the present disclosure.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a terminal in a wireless communication system, the method comprising:
   transmitting, to a base station (BS), a random access preamble in a physical random access channel (PRACH);
   receiving, from the BS, at least one of a plurality of random access responses (RARs) for the random access preamble, wherein the plurality of RARs comprise different uplink grants;
   identifying a RAR among the plurality of RARs;
   transmitting, to the BS, a first message comprising an identity of the terminal based on an uplink grant in the identified RAR; and
   receiving, from the BS, a second message comprising information indicating whether a random access of the terminal succeeds, in response to the first message,
   wherein a number of the plurality of RARs corresponds to a number of terminals including the terminal that transmit the random access preamble in the PRACH.

2. The method of claim 1,
   wherein the number of terminals that transmit the random access preamble in the PRACH is determined based on an angle of arrival (AoA) of random access signals transmitted from the terminals.

3. The method of claim 1, wherein the terminal transmits, to the BS, data comprising a portion of user data, further comprising:
   transmitting, to the BS, a plurality of random access signals comprising different data during the PRACH,
   wherein the user data is identified, by the BS by concatenating the different data from the plurality of random access signals.

4. The method of claim 1, wherein the transmitting of the random access preamble comprises transmitting, to the BS, the random access preamble and data, in the PRACH, and
   wherein the receiving of the plurality of RARs for the random access preamble comprises receiving, from the BS, the plurality of RARs for the random access preamble in response to a failure in decoding the data by the BS.

5. The method of claim 4, wherein the failure in decoding the data is caused by transmissions of the random access preamble from a plurality of terminals in the PRACH.

6. A method of a base station (BS) in a wireless communication system, the method comprising:
   receiving, from a terminal, a random access preamble in a physical random access channel (PRACH); and
   transmitting, to the terminal, a plurality of random access responses (RARs) for the random access preamble, wherein the plurality of RARs comprise different uplink grants for the terminal; and
   receiving, from the terminal, a first message that is transmitted based on an uplink grant, wherein the first message comprises an identity of the terminal; and
   transmitting, to the terminal, a second message comprising information indicating whether a random access of the terminal succeeds, in response to the message,
   wherein the uplink grant is included in a RAR that is identified by the terminal among the plurality of RARs, and
   wherein a number of the plurality of RARs corresponds to a number of terminals including the terminal that transmit the random access preamble in the PRACH.

7. The method of claim 6, wherein the BS receives from the terminal, data comprising a portion of user data, further comprising:
   receiving, from the terminal, a plurality of random access signals comprising different data during the PRACH,
   wherein the user data is identified by the BS by concatenating data from the plurality of random access signals.

8. The method of claim 6, wherein the number of terminals that transmit the random access preamble in the PRACH is determined based on an angle of arrival (AoA) of random access signals transmitted from the terminals.

9. The method of claim 6,
   wherein the RAR is randomly selected by the terminal among the plurality of RARs.

10. The method of claim 6, wherein the receiving of the random access preamble comprises receiving, from the terminal, the random access preamble and data, in the PRACH, and
   wherein the transmitting of the plurality of RARs for the random access preamble comprises transmitting, to the terminal, the plurality of RARs for the random access preamble in response to a failure in decoding the data by the BS.

11. The method of claim 10, wherein the failure in decoding the data is caused by transmissions of the random access preamble from a plurality of terminals in the PRACH.

12. A base station (BS) in a wireless communication system, the base station comprising:
   a transceiver; and
   at least one processor, operatively connected to the transceiver, configured to:
      receive, from a terminal, a random access preamble, in a physical random access channel (PRACH),
      transmit, to the terminal, a plurality of random access responses (RARs) for the random access preamble, wherein the plurality of RARs comprise different uplink grants for the terminal,
      receive, from the terminal, a first message that is transmitted based on an uplink grant, wherein the first message comprises an identity of the terminal, and
      transmit, to the terminal, a second message comprising information indicating whether a random access of the terminal succeeds, in response to the first message,
   wherein the uplink grant is included in a RAR that is identified by the terminal among the plurality of RARs, and
   wherein a number of the plurality of RARs corresponds to a number of terminals including the terminal that transmit the random access preamble in the PRACH.

13. The base station of claim 12, wherein the base station receives, from the terminal, data comprising a portion of user data,
   wherein the at least one processor is configured to receive, from the terminal, a plurality of random access signals comprising different data during the PRACH, and
   wherein the user data is identified by the BS, by concatenating the different data from the plurality of random access signals.

14. The base station of claim 12, wherein the number of terminals that transmit the random access preamble in the PRACH is determined based on an angle of arrival (AoA) of random access signals transmitted from terminals.

15. The base station of claim 12, wherein the RAR is randomly selected by the terminal among the plurality of RARs.

16. The BS of claim 12, wherein the transceiver is further configured to receive, from the terminal, the random access preamble and data, in the PRACH, and wherein the transceiver is further configured to transmit, to the terminal, the plurality of RARs for the random access preamble in response to a failure in decoding the data by the BS.

17. The BS of claim 16, wherein the failure in decoding the data is caused by transmissions of the random access preamble from a plurality of terminals in the PRACH.

* * * * *